United States Patent
Shirakura

(10) Patent No.: US 8,980,779 B2
(45) Date of Patent: Mar. 17, 2015

(54) METHOD OF REGENERATING $NO_x$ REMOVAL CATALYST

(75) Inventor: Shigeo Shirakura, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 1022 days.

(21) Appl. No.: 10/518,627

(22) PCT Filed: Jun. 19, 2003

(86) PCT No.: PCT/JP03/07787
§ 371 (c)(1),
(2), (4) Date: Aug. 8, 2005

(87) PCT Pub. No.: WO03/000461
PCT Pub. Date: Dec. 31, 2003

(65) Prior Publication Data
US 2006/0058176 A1    Mar. 16, 2006

(30) Foreign Application Priority Data

Jun. 21, 2002   (JP) .................................. 2002-181180

(51) Int. Cl.
*B01J 21/20*   (2006.01)
*B01J 23/90*   (2006.01)
(Continued)

(52) U.S. Cl.
CPC ............. *B01J 38/48* (2013.01); *B01D 53/8625* (2013.01); *B01D 53/96* (2013.01); *F01N 3/0842* (2013.01); *F01N 3/20* (2013.01)
USPC .............................................. 502/20; 502/22

(58) Field of Classification Search
CPC .......... B01J 38/48; F01N 3/0842; F01N 3/20; B01D 53/8625; B01D 53/96
USPC ....................................................... 502/20, 22
See application file for complete search history.

(56) References Cited

U.S. PATENT DOCUMENTS 4,085,193 A * 4/1978 Nakajima et al. .......... 423/239.1
4,164,546 A * 8/1979 Welty et al. ................ 423/239.1
(Continued)

FOREIGN PATENT DOCUMENTS

JP   52-27091 A   3/1977
JP   53-125964 A   11/1978
(Continued)

OTHER PUBLICATIONS

Merriam-Webster, Inc., "dry," Merriam-Webster Online. Nov. 18, 2008 <http://www.merriam-webster.com/dictionary/dry>.*

*Primary Examiner* — Anthony J Zimmer
(74) *Attorney, Agent, or Firm* — Sughrue Mion, PLLC

(57) ABSTRACT

A method for regenerating an $NO_x$ removal catalyst, the method being capable of readily restoring the catalytic activity of a deteriorated $NO_x$ removal catalyst; being performed by simple operations; and attaining high operational efficiency. The method for regenerating an $NO_x$ removal catalyst 14 employed in a flue gas $NO_x$ removal apparatus includes immersing the $NO_x$ removal catalyst at ambient temperature in regeneration water 31 containing substantially no chlorine and no cleaning component; removing the catalyst from the regeneration water; and removing water from the catalyst.

15 Claims, 8 Drawing Sheets

(51) Int. Cl.
*B01J 25/04* (2006.01)
*B01J 27/28* (2006.01)
*B01J 29/90* (2006.01)
*B01J 31/40* (2006.01)
*B01J 38/00* (2006.01)
*B01J 38/72* (2006.01)
*B01J 38/48* (2006.01)
*B01D 53/86* (2006.01)
*B01D 53/96* (2006.01)
*F01N 3/08* (2006.01)
*F01N 3/20* (2006.01)

(56) References Cited

U.S. PATENT DOCUMENTS

| | | |
|---|---|---|
| 6,232,254 B1 | 5/2001 | Schneider et al. |
| 6,241,826 B1 | 6/2001 | Dittmer et al. |
| 6,482,762 B1 * | 11/2002 | Ruffin et al. .................... 502/33 |
| 6,484,733 B2 * | 11/2002 | Budin et al. ................ 134/22.19 |
| 6,759,565 B1 * | 7/2004 | Kato et al. ................. 423/240 R |
| 2004/0074809 A1 * | 4/2004 | Yaluris et al. .................. 208/113 |

FOREIGN PATENT DOCUMENTS

| | | |
|---|---|---|
| JP | 59-062350 A | 4/1984 |
| JP | 64-080444 A | 3/1989 |
| JP | 1-119343 A | 5/1989 |
| JP | 4-197451 A | 7/1992 |
| JP | 7-116523 A | 5/1995 |
| JP | 7-222924 A | 8/1995 |
| JP | 8-196920 A | 8/1996 |
| JP | 10-156192 A | 6/1998 |
| JP | 10-156193 A | 6/1998 |
| JP | 10-235209 A | 9/1998 |
| JP | 10-337482 A | 12/1998 |
| JP | 2994769 B2 | 10/1999 |
| JP | 2000-107612 A | 4/2000 |
| JP | 3059136 B2 | 4/2000 |

* cited by examiner

Confirmation of regeneration effect and second regeneration effect

Regeneration effect on $NO_x$ removal catalyst
employed in thermal power station using heave oil as fuel Concentrations at catalyst surface before and after regeneration (a)

(b)

METHOD OF REGENERATING $NO_x$ REMOVAL CATALYST

TECHNICAL FIELD

The present invention relates to a method for regenerating an $NO_x$ removal catalyst for use with a flue gas $NO_x$ removal apparatus installed in a facility such as a thermal power station.

BACKGROUND ART

Conventionally, boilers provided in thermal power stations and a variety of large-scale boilers employing a fuel such as petroleum, coal, or fuel gas, waste incinerators, and similar apparatuses have been equipped with a flue gas $NO_x$ removal apparatus which contains a plurality of $NO_x$ removal catalyst layers.

The $NO_x$ removal catalyst is generally composed of a carrier (e.g., $TiO_2$), an active component (e.g., $V_2O_5$), and a co-catalyst component (e.g., tungsten oxide or molybdenum oxide), and multi-component oxide $NO_x$ removal catalysts such as $VO_x$—$WO_y$—$TiO_2$ and $VO_x$—$MoO_y$—$TiO_2$ are employed.

The $NO_x$ removal catalysts typically assume the form of honeycomb, plate, etc. Honeycomb-form catalysts include a coated catalyst, which is fabricated by producing a honeycomb substrate and coating the substrate with a catalyst component; a kneaded catalyst, which is fabricated by kneading a substrate material with a catalyst component and molding into a honeycomb catalyst; and an impregnated catalyst, which is fabricated by impregnating a honeycomb substrate with a catalyst component. Plate-form catalyst are fabricated by coating a metallic substrate or a ceramic substrate with a catalyst component.

In any case, during use, the catalytic performance of the above catalysts is problematically deteriorated with elapse of time as a result of deposition, on the surface of the catalysts, of a substance which deteriorates the catalytic performance (hereinafter referred to as deteriorating substance) or through migration of the dissolved deteriorating substance into the catalysts.

In this connection, a variety of methods for regenerating an $NO_x$ removal catalyst have conventionally been studied.

For example, there have been studied some methods including physically removing a deteriorated portion and foreign matter so as to expose a catalytically active surface; e.g., a method including abrasion an inner surface of a discharge gas conduit by use of an abrasive (Japanese Patent Application Laid-Open (kokai) No. 1-119343); a method including scraping a deteriorated surface portion of an $NO_x$ removal catalyst to thereby expose a catalytically active new surface (Japanese Patent Application Laid-Open (kokai) No. 4-197451); and a method including causing a gas accompanying microparticles to flow through a through-hole to thereby remove foreign matter (Japanese Patent Application Laid-Open (kokai) No. 7-116523).

In addition, there have been studied catalytic performance regeneration methods through washing; e.g., a method including washing a deteriorated catalyst with an acid (pH≤55) or an alkali (pH≥8) (Japanese Patent Application Laid-open (kokai) No, 64-80444); a method including washing a deteriorated catalyst sequentially with water or a dilute aqueous inorganic acid solution, with a 0.1 to 5 wt. % aqueous oxalic acid solution, and with water to remove oxalic acid residing on the catalyst (Japanese Patent Application Laid-Open (kokai) No. 7-222942); and a method including washing a deteriorated catalyst with water (50° C. to 80° C.), followed by drying (Japanese Patent Application Laid-Open (kokai) No. 8-196920).

However, methods based on physical abrasion or a similar technique have drawbacks in that operation is cumbersome and that an $NO_x$ removal catalyst itself is cracked or broken during a regeneration process.

In the case of washing an $NO_x$ removal catalyst, an alkaline component is removed through washing with an aqueous alkaline solution, hot water, etc., and heavy metal components predominantly containing vanadium are effectively removed through washing with an aqueous oxalic acid solution. However, even though these washing-based approaches are employed, washing out the deteriorating substances would be insufficient. Thus, washing-based regeneration methods employing a variety of cleaning components have been studied.

For example, the following regeneration methods have been proposed:

a method for regenerating activity of an $NO_x$ removal catalyst exhibiting a percent conversion to $SO_3$ that is elevated through deposition of vanadium, wherein the catalyst is washed with a 0.1 to 30% aqueous citric acid solution and a 0.1 to 20% aqueous sulfuric acid solution (Japanese Patent Application Laid-Open (kokai) No. 10-156192);

a method for regenerating an $NO_x$ removal catalyst having lowered $NO_x$ removal performance, wherein the catalyst is washed with a cleaning liquid having a hydrofluoric acid concentration of 0.3 to 3 wt. % at a constant temperature of 20 to 80° C. (Japanese Patent Application Laid-Open (kokai) No. 10-235209);

a method for regenerating activity of an $NO_x$ removal catalyst exhibiting percent $NO_x$ removal lowered by deposition of Na and K originating from a boiler employing heavy oil as a fuel and exhibiting a percent conversion to $SO_3$ that is elevated through adhesion of vanadium contained in the fuel, wherein the catalyst is washed with an aqueous inorganic alkaline solution and an oxidizing agent solution (Japanese Patent Application Laid-Open (kokai) No. 10-156193);

a method for regenerating an $NO_x$ removal catalyst containing a vanadium compound and titanium oxide, the catalyst having been deteriorated by sulfur oxide, wherein the activity-deteriorated catalyst is brought into contact with an aqueous solution containing a substance which generates ammonia in the presence of acid or by heat, and the mixture is heated or treated with acid, followed by drying and firing in air (Japanese Patent Application Laid-Open (kokai) No. 2000-107612); and a method for regenerating an $NO_x$ removal catalyst exhibiting $NO_x$ removal performance lowered through poisoning by an arsenic compound contained in a discharge gas from a boiler employing coal as a fuel, wherein the catalyst is immersed in a cleaning liquid having a sulfuric acid concentration or an ammonia concentration of 0.05 to 20 wt. % at a constant temperature of 10 to 90° C., followed by washing the catalyst with water (Japanese Patent No. 3059136).

Treatment of the wastewater after washing the catalyst has also been studied, and some wastewater treatment methods have been proposed. For example, in a method for regenerating activity of an $NO_x$ removal catalyst on which vanadium has been deposited, which method includes washing the catalyst with a cleaning liquid including an aqueous organic acid solution, an aqueous inorganic acid solution, or an aqueous alkaline solution, there has been proposed a method for regenerating wastewater including removing eluted vanadium ions from a wash wastewater through ion exchange (Japanese Patent Application Laid-Open (kokai) No. 10-33482). In regeneration of performance of an $NO_x$ removal catalyst exhibiting $NO_x$ removal performance lowered through employment in $NO_x$ removal from a combustion discharge gas from a boiler and $SO_2$ oxidation performance elevated through the same, by regeneration treatment of the catalyst in water or an aqueous oxalic acid solution, there has been proposed a method of reusing the regeneration water or regeneration aqueous oxalic acid solution, wherein the water or aqueous oxalic acid solution is fed into a furnace of the above boiler (Japanese Patent No. 2994769).

As described above, there have still been studied a variety of methods for regenerating an $NO_x$ removal catalyst including washing the $NO_x$ removal catalyst and methods for treating wastewater produced by washing of the catalyst. However, all these methods are still unsatisfactory.

In view of the foregoing, an object of the present invention is to provide a method for regenerating an $NO_x$ removal catalyst, the method being capable of readily restoring the catalytic activity of a deteriorated $NO_x$ removal catalyst; being performed by simple operations; and attaining high operational efficiency.

DISCLOSURE OF THE INVENTION

The present inventors have carried out extensive studies in order to attain the aforementioned object, and have found that the catalytic activity of an $NO_x$ removal catalyst, particularly that of an $NO_x$ removal catalyst which has been used with a $NO_x$ removal apparatus for a flue gas from a boiler employing coal as a fuel, can be sufficiently restored by merely immersing the catalyst in pure water at ambient temperature, that the used catalyst regeneration water can be repeatedly used, and that the reused water can be treated in a comparatively simple manner by virtue of containing no heavy metal content. The present invention has been accomplished on the basis of these findings.

That is, the inventors have carried out extensive studies, and have found that the catalytic performance of an $NO_x$ removal catalyst, particularly that of an $NO_x$ removal catalyst which has been employed in a thermal power station employing coal as a fuel, can be sufficiently restored by merely immersing the catalyst in pure water at ambient temperature, since the substances which cover the surface of the $NO_x$ removal catalyst to thereby deteriorate catalytic performance are Ca content (alkaline content) and S content (acidic content), which are readily eluted and removed. The present invention has been accomplished on the basis of these findings.

Accordingly, a first mode of the present invention provides a method for regenerating an $NO_x$ removal catalyst employed in a flue gas $NO_x$ removal apparatus, characterized in that the method comprises immersing the $NO_x$ removal catalyst at ambient temperature in regeneration water containing substantially no chlorine and no cleaning component; removing the catalyst from the regeneration water; and removing water from the catalyst.

According to the first mode, inhibitors deteriorating $NO_x$ removal performance can be readily eluted and removed by merely immersing the $NO_x$ removal catalyst at substantially ambient temperature in regeneration water. Thus, $NO_x$ removal performance can be restored.

A second mode of the present invention is drawn to a specific embodiment of the method for regenerating an $NO_x$ removal catalyst of the first mode, wherein the $NO_x$ removal catalyst is immersed in regeneration water until bubbling stops.

According to the second mode, the $NO_x$ removal catalyst is immersed in regeneration water until bubbling stops. Therefore, inhibitors can be readily eluted and removed, thereby regenerating $NO_x$ removal performance. Thus, $NO_x$ removal performance can be restored.

A third mode of the present invention is drawn to a specific embodiment of the method for regenerating an $NO_x$ removal catalyst of the first or second mode, wherein the $NO_x$ removal catalyst removed from the regeneration water is washed with water.

According to the third mode, the $NO_x$ removal catalyst removed from the regeneration water is washed with water. Therefore, foreign matter such as dust deposited on the catalyst surface can be removed.

A fourth mode of the present invention is drawn to a specific embodiment of the method for regenerating an $NO_x$ removal catalyst of any of the first to third modes, wherein the regeneration water in which the $NO_x$ removal catalyst has been immersed is repeatedly used a plurality of times.

According to the fourth mode, water for regenerating the $NO_x$ removal catalyst is repeatedly used, thereby conserving water and reducing the amount of excessive wastewater.

A fifth mode of the present invention is drawn to a specific embodiment of the method for regenerating an $NO_x$ removal catalyst of any of the first to fourth modes, wherein the $NO_x$ removal catalyst having been regenerated is installed in the flue gas $NO_x$ removal apparatus without drying before installation.

According to the fifth mode, the $NO_x$ removal catalyst can be installed in the flue gas $NO_x$ removal apparatus, while eliminating a drying step for drying the $NO_x$ removal catalyst.

A sixth mode of the present invention is drawn to a specific embodiment of the method for regenerating an $NO_x$ removal catalyst of any of the first to fifth modes, wherein the $NO_x$ removal catalyst having been regenerated is installed in the flue gas $NO_x$ removal apparatus after catalytic performance of the regenerated $NO_x$ removal catalyst is assessed.

According to the sixth mode, catalytic performance of the regenerated $NO_x$ removal catalyst is assessed, and the catalyst is employed after assessing of regeneration effect. Therefore, $NO_x$ removal performance can be securely maintained.

A seventh mode of the present invention is drawn to a specific embodiment of the method for regenerating an $NO_x$ removal catalyst of any of the first to sixth modes, wherein the regenerated $NO_x$ removal catalyst is installed in the flue gas $NO_x$ removal apparatus such that the catalyst is inverted with respect to the direction of the flow of discharge gas.

According to seventh mode, the regenerated $NO_x$ removal catalyst is inverted in use, and the status in previous use of a portion virtually involved in $NO_x$ removal can be altered to a new status. Therefore, $NO_x$ removal performance can be maintained at a higher level.

In the method of the present invention, the point in time for regenerating a catalyst may be assessed periodically at appropriate times during a service period of the $NO_x$ removal catalyst. In an actual state, deterioration of a plurality of $NO_x$ removal catalyst layers occurs non-uniformly, and order of deterioration, the start of deterioration, etc. in respective layers differ depending on the conditions of use.

Thus, the deterioration statuses of respective $NO_x$ catalyst layers are assessed with high precision, and the aforementioned regeneration treatment is preferably performed only when the performance of a catalyst is deteriorated below a predetermined level.

In order to assess deterioration statuses of respective $NO_x$ removal catalyst layers, $NO_x$ concentration and unreacted $NH_3$ concentration of each catalyst layer are determined, and percent $NO_x$ removal and percent contribution of each catalyst layer may be calculated from the determined $NO_x$ concentration, whereby performance-deteriorated catalysts are detected (Japanese Patent Publication (kokoku) No. 7-47108). In this case, when the catalytic performance is evaluated by the percent contribution calculated on the basis of the $NO_x$ concentration, the catalyst layer(s) having actually deteriorated performance are difficult to detect correctly. Thus, the deterioration status of each $NO_x$ removal catalyst layer is preferably managed through following procedure.

That is, preferably, $NO_x$ concentrations and $NH_3$ concentrations on the inlet and outlet sides of respective $NO_x$ removal catalyst layers are determined; percent $NO_x$ removal ($\eta$) is determined on the basis of an inlet mole ratio (i.e., inlet $NH_3$/inlet $NO_x$); and performance of respective $NO_x$ removal catalyst layers is evaluated on the basis of the percent $NO_x$ removal ($\eta$). According to the above method, $NO_x$ concentrations and $NH_3$ concentrations are determined on the inlet and outlet sides of respective $NO_x$ removal catalyst layers, and the percent $NO_x$ removal ($\eta$) is determined on the basis of an inlet mole ratio. Therefore, the percent $NO_x$ removal, which is enhanced as the mole ratio increases, can be evaluated on an absolute basis and correctly.

In this case, the percent $NO_x$ removal ($\eta$) of respective $NO_x$ removal catalyst layers may be determined on the basis of $NO_x$ concentrations. However, the percent $NO_x$ removal ($\eta$) is preferably determined on the basis of $NH_3$ concentrations rather than on the basis of $NO_x$ concentrations, since the catalytic performance can be assessed with smaller variation.

In order to even more correctly assess the deterioration status of the catalysts, a portion of the target $NO_x$ removal catalyst may be sampled, and the sampled catalyst may be evaluated in terms of catalytic performance.

As described hereinabove, according to the present invention, the catalytic performance of an $NO_x$ removal catalyst, particularly of an $NO_x$ removal catalyst which has been employed in a coal-based thermal power station, can be sufficiently restored by merely immersing the catalyst in pure water at ambient temperature. The regeneration water which has been used can be repeatedly used. The regeneration water, which contains no heavy metals, can be treated in a comparatively easy manner.

BEST MODES FOR CARRYING OUT THE INVENTION

An embodiment of the present invention will next be described.

Figure 1:
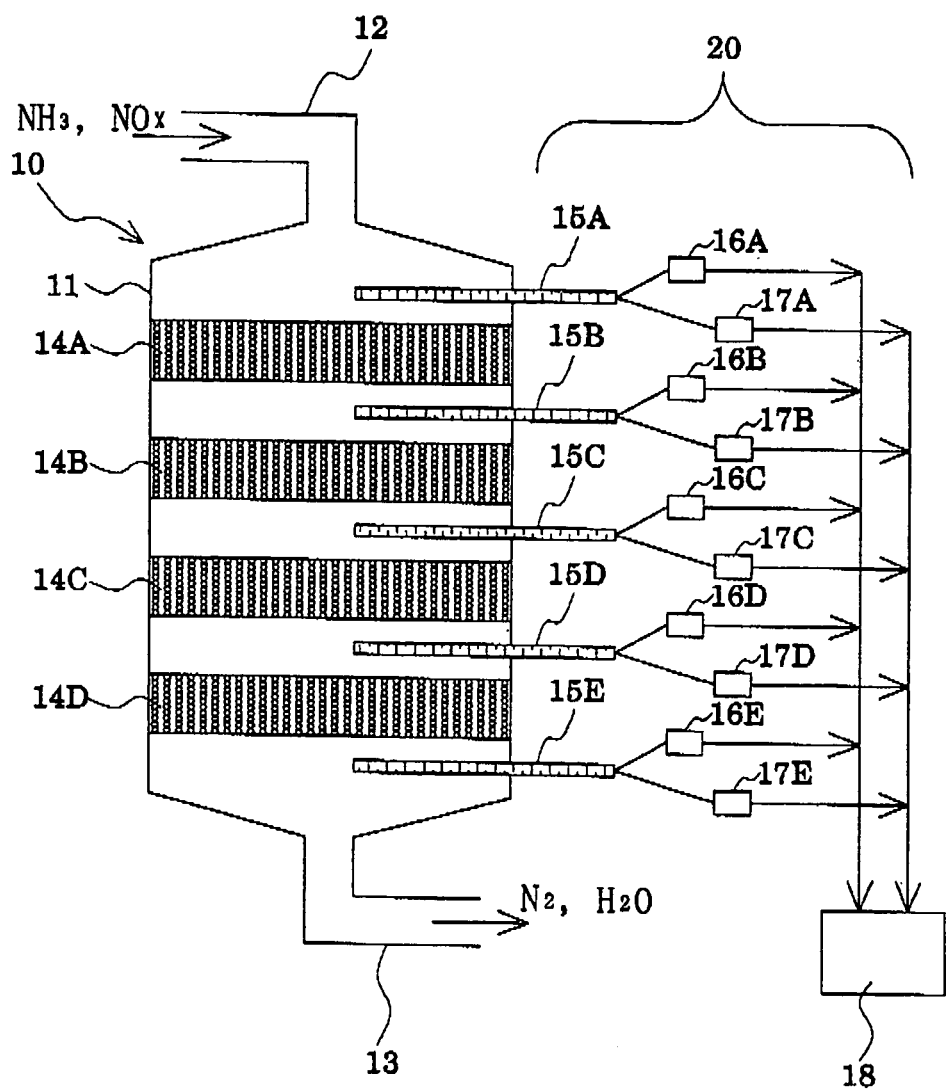
FIG. 1 schematically shows a configuration of a flue gas $NO_x$ removal apparatus employing an $NO_x$ removal catalyst to which the method of the present invention is applied.

FIG. 1 schematically shows a configuration of a flue gas $NO_x$ removal apparatus equipped with an $NO_x$ removal catalyst to which the method of the present invention is applied. Actually, the flue gas $NO_x$ removal apparatus is provided in a thermal power station. However, no particular limitation is imposed on the facility that includes the $NO_x$ removal catalyst management unit of the embodiment.

As shown in FIG. 1, a flue gas $NO_x$ removal apparatus 10 includes an exhaust duct 12 and a treated gas duct 13. The exhaust duct 12 is in communication with a boiler unit installed in a thermal power station that is connected with an apparatus body 11 on the upstream side. The treated gas duct 13 is connected with the apparatus body 11 on the downstream side. In the apparatus body 11, a plurality of $NO_x$ removal catalyst layers (4 layers in this embodiment) 14A to 14D are disposed at predetermined intervals. The $NO_x$ removal catalyst layers 14A to 14D are arranged so that a discharge gas introduced through the exhaust duct 12 is sequentially passed therethrough, and reduce the level of nitrogen oxide ($NO_x$) of the discharge gas through contact with the discharge gas passing through the catalyst layers. Notably, to the exhaust duct 12 communicating with the boiler unit, $NH_3$ is injected in an amount in accordance with the amount of the discharge gas fed from the boiler body.

No particular limitation is imposed on the type, shape, etc. of the catalysts 14A to 14D. Generally, each catalyst is composed of $TiO_2$ serving as a carrier and $V_2O_5$ serving as an active component. The catalysts assume the form of honeycomb, plate, etc.

In the present embodiment, each catalyst layer employs a catalyst in the form of columnar honeycomb, and a plurality of catalyst layers are arranged in combination, thereby forming the catalyst layers 14A to 14D.

An $NO_x$ removal catalyst management unit 20 is provided with gas sampling means 15A through 15E on the inlet and outlet sides of respective $NO_x$ removal catalyst layers 14A through 14D. The gas sampling means 15A through 15E are connected with $NO_x$ concentration measurement means 16A through 16E and with $NH_3$ concentration measurement means 17A through 17E. The data obtained by the measurement means are transferred to a percent $NO_x$ removal determination means 18 for calculating percent $NO_x$ removal and percent $NO_x$ removal contribution of the respective $NO_x$ removal catalyst layers 14A through 14D.

The gas sampling means 15A through 15E sample, via sampling tubes, a gas to be sampled in a desired amount and at a desired timing, and subsequently feed the sampled gas to the $NO_x$ concentration measurement means 16A through 16E and to the $NH_3$ concentration measurement means 17A through 17E.

No particular limitation is imposed on the timing for sampling a gas by the gas sampling means 15A through 15E. Generally, sampling is carried out during usual operation of the power station, preferably at the nominal load where the amount of gas reaches the maximum, if possible. The interval between sampling operations may be prolonged to about six months, and the interval is sufficient for managing the performance of the $NO_x$ removal catalyst layers 14A through 14D. However, if the interval is shortened, precision in management is enhanced. Thus, the sampling is preferably carried out, for example, once every one to two months. Particularly, in a catalyst layer placed on the downstream side, variation of obtained data increases due to decrease in $NH_3$ concentration. Thus, in order to attain better management and evaluation, preferably, determination of $NH_3$ concentration is performed at short intervals, and percent $NO_x$ removal is calculated from an averaged $NH_3$ concentration value.

The percent $NO_x$ removal determination means 18 collects the measurement data from the $NO_x$ concentration measurement means 16A through 16E and the $NH_3$ concentration measurement means 17A through 17E, and calculates, from the measurement data, percent $NO_x$ removal and percent $NO_x$ removal contribution of respective $NO_x$ removal catalyst layers 14A through 14D.

On the basis of an inlet mole ratio (i.e., inlet $NH_3$/inlet $NO_x$) of the $NO_x$ removal catalyst layers 14A through 14D, the $NH_3$-concentration-based percent $NO_x$ removal ($\eta$) is determined from the following equation (1):

$$\eta = \{(\text{inlet } NH_3 - \text{outlet } NH_3)/(\text{inlet } NH_3 = \text{outlet } NH_3 + \text{outlet } NO_x)\} \times 100 \times (\text{evaluation mole ratio/inlet mole ratio}) \quad (1).$$

As used herein, the term "evaluation mole ratio" refers to a mole ratio which is predetermined for the purpose of evaluating an $NO_x$ removal catalyst. The evaluation mole ratio may be predetermined to an arbitrary value; for example, 0.8, which is almost equal to a mole ratio typically employed for operating a power station.

Specifically, percent $NO_x$ removal ($\eta$) of respective $NO_x$ removal catalyst layers 14A through 14D is determined through a technique on the basis of the inlet mole ratio, and the performance of the catalysts is managed on the basis of the determined percent $NO_x$ removal values. When the percent $NO_x$ removal ($\eta$) of a certain catalyst drops below a predetermined level, the catalyst exhibiting deteriorated performance undergoes the regeneration method of the present invention for restoring catalytic performance.

Figure 2:
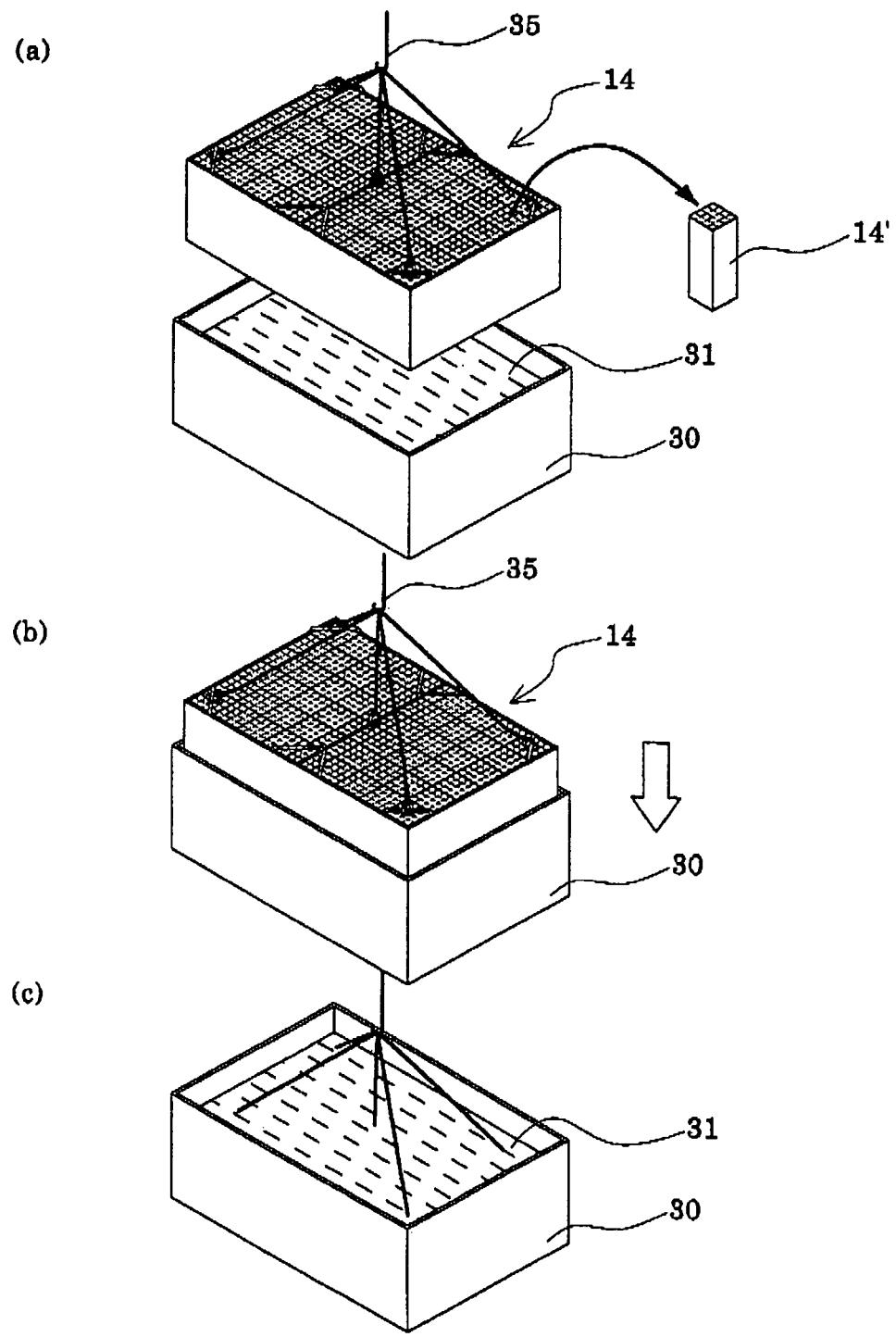
FIGS. 2(a) to 2(c) illustrate a regeneration method according to one embodiment of the present invention.

FIG. 2 illustrates a procedure of carrying out a method according to an embodiment of the present invention. As illustrated in FIG. 2, an $NO_x$ removal catalyst layer 14 to be subjected to regeneration treatment employs a plurality of $NO_x$ removal catalysts 14', each assuming the form of columnar honeycomb, arranged in combination. A regeneration tank 30 having such dimensions as to be able to accommodate the catalyst layer 14 is provided. The regeneration tank 30 contains regeneration water 31 containing substantially no chlorine (pure water in the embodiment). The regeneration water contains substantially no chlorine, in view that chlorine inhibits catalytic activity.

The regeneration water 31 is virtually neutral, and contains no components which are conventionally employed for cleaning; e.g., acids, alkali substances, and other additives. The temperature of the regeneration water may be ambient temperature, and no particular heating is required. As used herein, the term "ambient temperature" refers to a temperature falling within a range of, for example, about 5° C. to about 40° C. The regeneration water 31 may be used repeatedly. Needless to say, during its second use the regeneration water 31 contains components which have been eluted during the first regeneration treatment.

In carrying out of the method of the present invention, the $NO_x$ removal catalyst layer 14 is suspended by means of a crane 35 or a similar apparatus (FIG. 2(a)), and the catalyst layer 14 is immersed in regeneration water 31 accommodated in the regeneration tank 30 (FIGS. 2(b) to 2(c)). The time required for immersion is some minutes or longer, and equal to a roughly estimated period of time for completing bubbling from the $NO_x$ removal catalyst layer 14; e.g., about 1 to 30 minutes, preferably 5 to 15 minutes.

The above regeneration effect is attributed to the effect of immersion of a catalyst in regeneration water. The immersion-based method enables elution of inhibitors within in a shorter time (see Example 7 mentioned below) as compared with washing by shower, thereby remarkably restoring percent $NO_x$ removal.

The amount of regeneration water 31 may be such an amount as to completely immerse the $NO_x$ removal catalyst layer 14. However, regeneration water is preferably used in an amount of 2 to 3 times or more the volume of the $NO_x$ removal catalyst layer 14.

After completion of immersion, the $NO_x$ removal catalyst layer 14 is removed from regeneration water, and water is removed from the catalyst layer. No particular drying step is required. That is, the $NO_x$ removal catalyst layer 14 from which water has been removed may be installed in a flue gas $NO_x$ removal apparatus, followed by operating the apparatus. Such an undried catalyst layer is sufficiently dried by hot gas flow produced upon startup of the apparatus employing gas oil as a fuel. Needless to say, the catalyst layer may be dried (e.g., dried under sunlight) before installation.

After removal of the $NO_x$ removal catalyst layer 14 from regeneration water 31, the catalyst layer may be washed with water by showering. In this case, water containing substantially no chlorine is used. Showering is required particularly in the case where the regeneration water 31 has been repeatedly used. The main purpose of washing by showering is to wash out foreign matter such as dust deposited on a surface of the $NO_x$ removal catalyst layer 14.

The thus-regenerated $NO_x$ removal catalyst layer may be installed again in a flue gas $NO_x$ removal apparatus in its original position. Alternatively, the catalyst layer may be installed such that the catalyst layer is inverted with respect to the direction of the flow of discharge gas. As is already known, the degree of deterioration of $NO_x$ removal catalyst layers is greater in a catalyst layer placed on the upstream side of gas flow. Thus, inversion of the regenerated catalyst attains delocalization of working portions of an $NO_x$ removal catalyst layer. Notably, this inversion is conceived from the finding of the present applicant that the upstream side of the discharge gas flow exclusively plays a great role in $NO_x$ removal reaction.

The $NO_x$ removal catalyst layers which have undergone regeneration treatment exhibit a catalytic activity exhibited by new catalyst layers. For the purpose of confirmation, a portion of a catalyst may be sampled from a regenerated $NO_x$ removal catalyst layer, after which the sampled catalyst portion is evaluated in catalytic performance, and the evaluated catalyst layer is re-installed in a flue gas $NO_x$ removal apparatus. For example, a portion (50 mm×50 mm×100 mm in length) is cut from the inlet side of the each $NO_x$ removal catalyst layer, and set in a performance test machine. The test gas is fed under the conditions which match the design values of an actual $NO_x$ removal apparatus, and percent $NO_x$ removal is determined by measuring $NO_x$ concentration and $NH_3$ concentration on the outlet side of the catalyst sample, thereby evaluation $NO_x$ removal performance. Whether or not the catalyst layer has been completely regenerated can be confirmed through the above procedure.

The regeneration water employed in the method of the present invention has been confirmed to be repeatedly usable about 30 times. Differing from a conventional method such as washing with oxalic acid-based cleaning liquid, the regeneration water which has been used several times contains no heavy metal components. Thus, no particular heavy metal treatment step is required for the regeneration water. The regeneration water is advantageous in that it can be treated by a wastewater treatment apparatus that is generally employed in, for example, a thermal power station.

Before the regeneration method of the present invention is carried out, a conventional abrasion treatment may also be performed. Inhibiting substances which are difficult to remove through abrasion can be completely removed through the method of the present invention.

As described hereinabove, the regeneration effect of the present invention can be attained, within a short period of time, by immersing an $NO_x$ removal catalyst in regeneration water. The regeneration water can be repeatedly used about 30 times. In contrast, washing a deteriorated catalyst with water by showering requires a longer period of time as compared with immersion. If wash water is repeatedly used in showering-based washing, provision of a large-scale pump is required, and nozzles may become plugged. Therefore, a large amount of fresh water must be provided for washing with water by showering.

Working Example 1

Each of the deteriorated $NO_x$ removal catalyst layers which had been used for about 63,000 hours in a flue gas $NO_x$ removal apparatus (equipped with four $NO_x$ removal catalyst layers as shown in FIG. 1) installed in an actual thermal power station employing coal as a fuel was removed from the apparatus. The catalyst layer was immersed for the purpose of regeneration at ambient temperature (about 25° C.) in pure water for about 10 minutes. After removal of the catalyst layer from water, the catalyst layer was lightly washed by showering.

Working Example 2

The $NO_x$ removal catalyst layers which had been regenerated in Working Example 1 were installed again in the flue gas $NO_x$ removal apparatus and were further used for about 28,300 hours (for a total of about 91,300 hours). The thus-used catalyst layer was regenerated again in a manner similar to that of Working Example 1.

Working Example 3

An $NO_x$ removal catalyst layer which had been used for about 91,300 hours in an actual thermal power station employing coal as a fuel was removed and cut into 30 pieces. By use of the 30 pieces, regeneration treatment similar to that performed in Working Example 1 was repeatedly carried out 30 times at ambient temperature in pure water.

Working Examples 4 and 5

Each of the $NO_x$ removal catalyst layers which had been used for about 21,100 hours in an actual thermal power station employing heavy oil as a fuel was regenerated in a manner similar to that of Working Example 1.

Comparative Example 1

The regeneration treatment of Working Example 1 was repeated, except that hot pure water (80° C.) was used instead of water at ambient temperature.

Comparative Example 2

Through-holes of an $NO_x$ removal catalyst layer were filled with a abrasion agent, and the $NO_x$ removal catalyst layer was micro-vibrated in a longitudinal direction of the through-holes, whereby the inner surfaces of the through-holes were subjected to abrasion. The degree of abrasion was regulated by modifying the time of micro-vibration. As a result, the inner surfaces were scraped at an average depth of about 40 µm.

Working Example 6

The $NO_x$ removal catalyst layer which had been subjected to abrasion in Comparative Example 2 was regenerated in a manner similar to that of working Example 1.

Working Example 7

The regeneration treatment of Working Example 1 was repeated. The time of immersion of each catalyst layer in pure water was varied among 1 min, 10 min, 30 min, and 60 min.

Test Example 1

A portion of each of the $NO_x$ removal catalyst layers regenerated in Working Examples 1 and 2 was sampled, and the sample was evaluated in performance through the following method.

Figure 3:
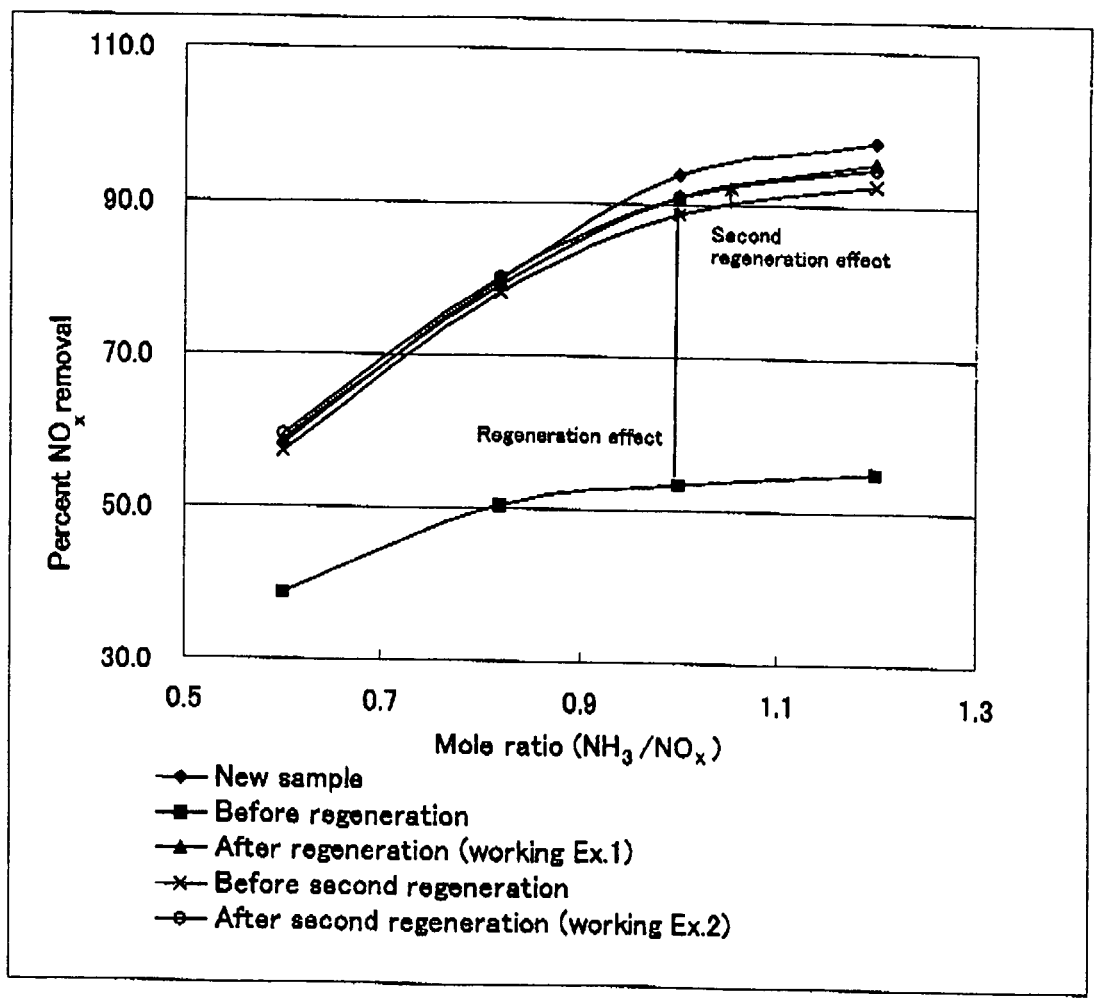
FIG. 3 is a graph showing the results of Test Example 1 of the present invention.

A portion (50 mm×50 mm×100 mm in length) was cut from the inlet side of the each $NO_x$ removal catalyst layer, and set in a performance test machine. The test gas was fed at an mole ratio (i.e., inlet mole ratio=inlet $NH_3$/inlet $NO_x$) of 0.6, 0.82, 1.0, or 1.2, and percent $NO_x$ removal ($\eta$) was determined on the basis of the aforementioned formula employing $NH_3$ concentration. The results are shown in FIG. 3.

As reference products, a new (fresh) catalyst layer, a catalyst layer which had not been regenerated (before regeneration in Working Example 1: used for 63,000 hours), and a catalyst layer which had not been re-regenerated (before regeneration in Working Example 2; used for 28,300 hours after first regeneration) were also measured in terms of percent $NO_x$ removal.

The results of Working Examples 1 and 2 indicate that catalytic activity of deteriorated catalyst layers can be restored almost to that of a new catalyst product by immersing the catalyst layers in pure water. In Working Example 2, percent $NO_x$ removal of the catalyst layer before second regeneration was not severely lowered. However, the percent $NO_x$ removal is confirmed to be restored to a level of Working Example 1.

Test Example 2

Figure 4:
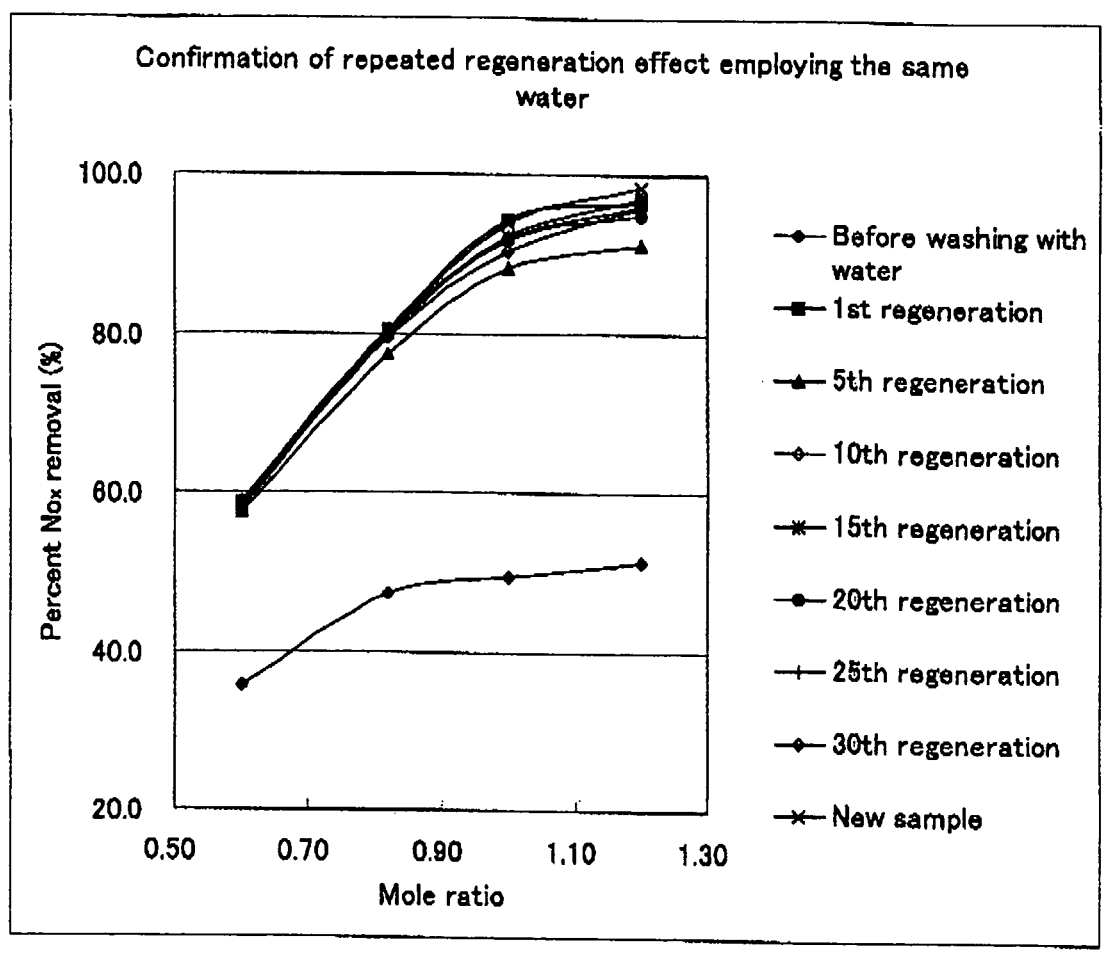
FIG. 4 is a graph showing the results of Test Example 2 the present invention.

From 30 catalyst portions of Working Example 3 which had successively been regenerated (first to 30th), portions were selected every five regeneration treatments carried out in the same regeneration water. Percent $NO_x$ removal of the samples was determined in a manner similar to that of Test Example 1. The results are shown in FIG. 4.

As reference preference samples, a new catalyst product and a catalyst layer before washing (before regeneration) were also subjected to percent $NO_x$ removal measurement.

The results indicate that the same regeneration water exhibits virtually the same regeneration effect even after performing regeneration repeatedly 30 times.

Test Example 3

Figure 5:
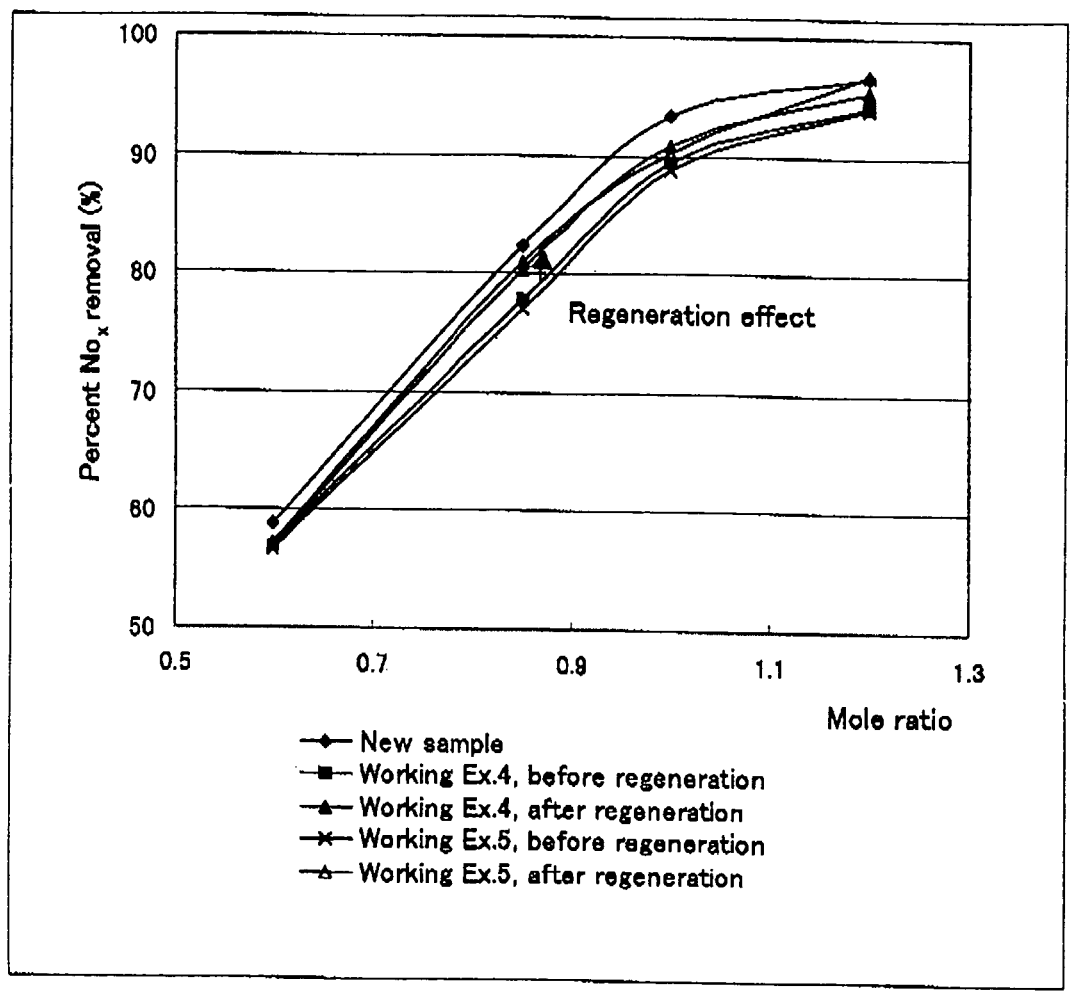
FIG. 5 is a graph showing the results of Test Example 3 the present invention.

Percent $NO_x$ removal of each of the samples of Working Examples 4 and 5 was determined before and after regeneration in a manner similar to that of Test Example 1. As a reference product, percent $NO_x$ removal of a new (fresh) catalyst layer was also determined. FIG. 5 shows the results.

The results indicate that $NO_x$ removal catalyst layers employed in a thermal power station employing heavy oil as a fuel may also be regenerated through the method of the present invention.

Test Example 4

Figure 6:
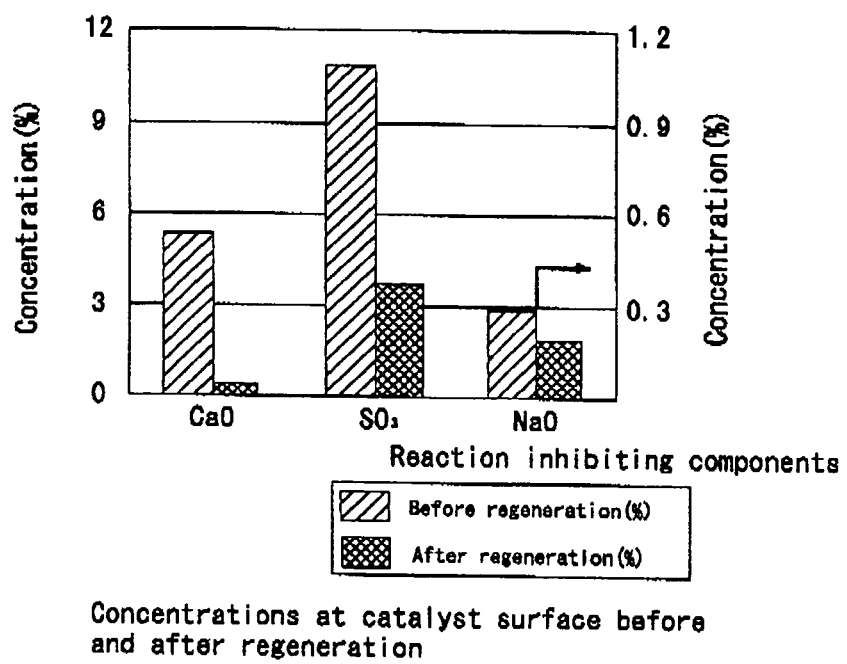
FIG. 6 is a graph showing the results of Test Example 4 the present invention.

Concentrations of inhibiting substances and catalyst components on the surface the catalyst sample of Working Example 1 were determined, before and after regeneration, by means of an X-ray microanalyzer. The results are shown in Table 1 and FIG. 6.

The results indicate that CaO, $SO_3$, and NaO, which are substances inhibiting catalytic activity, have been eluted through regeneration treatment. Increase in $TiO_2$ concentration and $WO_3$ concentration at the catalyst surface, which are closely related to catalytic activity, are confirmed, indicating that the catalytic activity has been restored. The results also indicate that ash components such as $SiO_2$ and $Al_2O_3$, which have conventionally been thought to inhibit catalytic activity, do not greatly affect the catalytic activity. Therefore, even if such ash components are not removed through regeneration treatment, catalytic activity can be sufficiently restored.

TABLE 1

| Components | | Before regeneration (%) | After regeneration (%) |
|---|---|---|---|
| Reaction inhibitor | CaO | 5.36 | 0.35 |
| | $SO_3$ | 10.84 | 3.67 |
| | NaO | 0.28 | 0.19 |
| Catalyst | $TiO_2$ | 24.2 | 37.3 |
| | $WO_3$ | 1.25 | 2.53 |
| Ash | $SiO_2$ | 43.5 | 44.8 |
| | $Al_2O_3$ | 3.09 | 3.69 |

Test Example 5

In a manner similar to that of Test Example 1, percent $NO_x$ removal of the samples of Working Example 1 and Comparative Examples 1 and 2 was determined at mole ratios of 0.82 and 1.0. From the obtained values, percent regeneration and percent restoration of the samples were calculated on the basis of the following formulae (2) and (3), and analyzed with comparison. The results are shown in Tables 2 and 3. Percent $NO_x$ removal of a new (fresh) catalyst layer serving as a reference sample is also shown in each table.

The results indicate that regeneration of Working Example 1 (in pure water at ambient temperature) attains percent restoration equivalent to that obtained in Comparative Example 1 (in hot water at 80° C.) and Comparative Example 2 (inner surface scraped).

Percent regeneration (%)=[(percent $NO_x$ removal after regeneration)−(percent $NO_x$ removal before regeneration)]/[(percent $NO_x$ removal of new sample)−(percent $NO_x$ removal before regeneration)]×100    (2)

Percent restoration (%)=[(percent $NO_x$ removal after regeneration)/(percent $NO_x$ removal of new sample)]×100    (3)

TABLE 2

| Mole ratio = 0.82 | Percent $NO_x$ removal before regeneration | Percent $NO_x$ removal after regeneration | Percent regeneration | Percent restoration |
|---|---|---|---|---|
| New sample | 81.0 | | | |
| Working Ex. 1 | 77.2 | 80.2 | 79% | 99% |
| Comp. Ex. 1 | 79.2 | 80.8 | 61% | 100% |
| Comp. Ex. 2 | 76.3 | 79.4 | 65% | 98% |

TABLE 3

| Mole ratio = 1.0 | Percent $NO_x$ removal before regeneration | Percent $NO_x$ removal after regeneration | Percent regeneration | Percent restoration |
|---|---|---|---|---|
| New sample | 94.4 | | | |
| Working Ex. 1 | 87.1 | 91.8 | 64% | 97% |
| Comp. Ex. 1 | 84.5 | 91.8 | 74% | 97% |
| Comp. Ex. 2 | 83.4 | 92.2 | 80% | 98% |

Test Example 6

Figure 7:
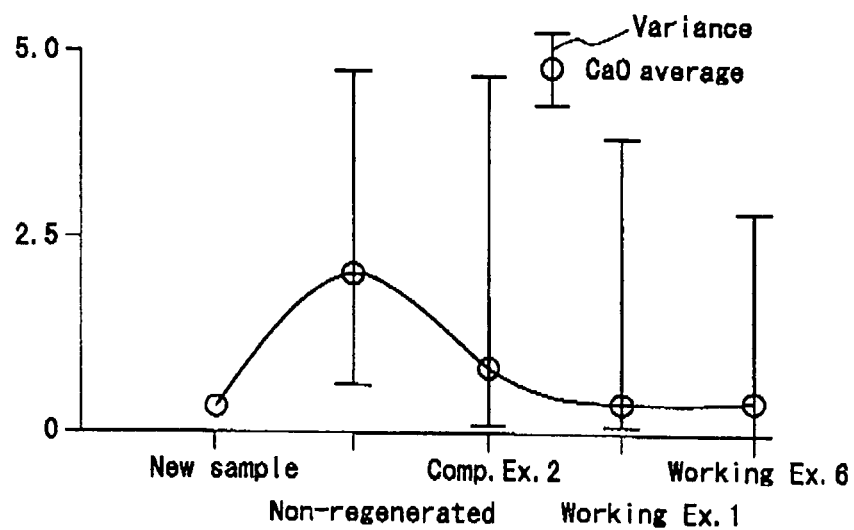
FIGS. 7(a) and 7(b) are graphs showing the results of Test Example 6 the present invention.
Figure 7:
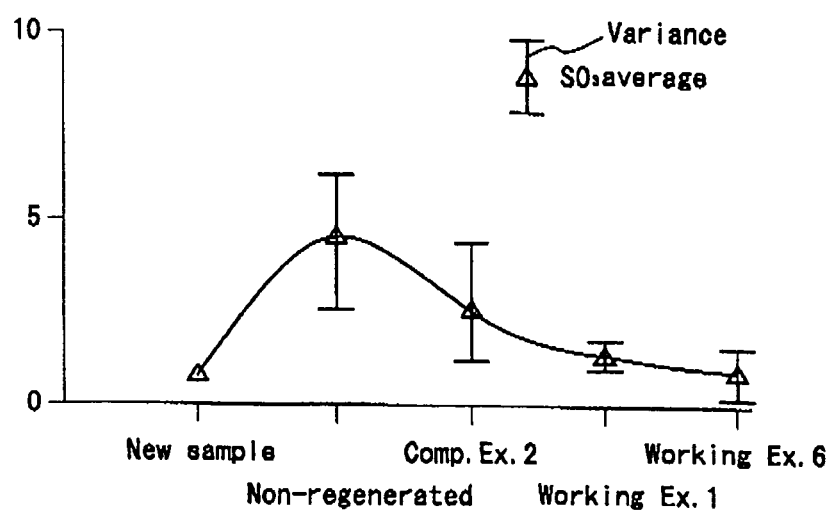

Concentrations (reduced to element) of inhibiting substances (CaO and $SO_3$) on the surface of each of the catalyst samples of Working Examples 1 and 6 and Comparative Example 2 were determined, before and after regeneration, by means of an X-ray microanalyzer. The results are shown in FIG. 7. Each concentration is shown in FIG. 7 with an average value and variance obtained from a plurality of measurements.

The results indicate that substances inhibiting catalytic performance are more effectively reduced through regeneration treatment of Working Example 1 (in pure water at ambient temperature), as compared with Comparative Example 2 (abrasion treatment). The results also indicate that substances inhibiting catalytic performance are more effectively reduced through regeneration treatment of Working Example 6 (in pure water at ambient temperature after abrasion of inner surface), as compared with Comparative Example 2.

Therefore, the regeneration method of the present invention is also effective even when performed after conventional abrasion treatment for regeneration. Such a mode of combined treatments should also be construed as falling within the scope of the present invention.

Test Example 7

Figure 8:
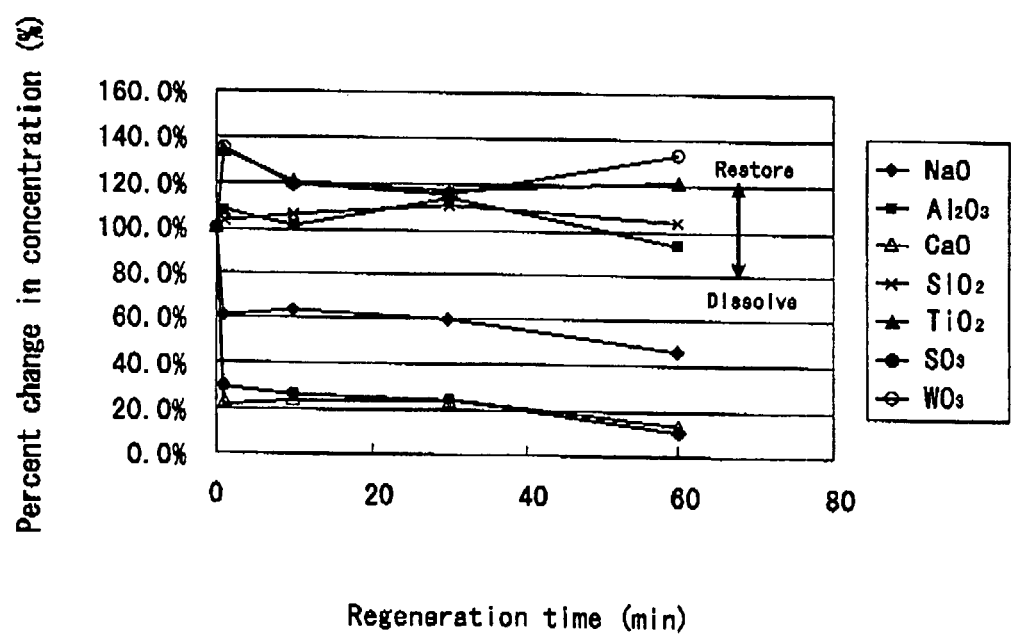
FIG. 8 is a graph showing the results of Test Example 7 the present invention.

Concentrations of components on the surface the catalyst sample of Working Example 7 were determined, before and after regeneration, by means of an X-ray microanalyzer. The results are shown in FIG. 8.

The results indicate that concentrations of CaO, $SO_3$, and NaO, which are substances inhibiting catalytic performance, obtained after immersion for one minute and those obtained after immersion for 60 minutes are almost equivalent. That is, there is no significant difference between the above two concentration groups.

Test Example 8

The regeneration water employed in Working Example 1 was analyzed in terms of eluted species. As reference and control cleaning liquid samples, 0.1N oxalic acid, 1N hydrochloric acid, 0.1N nitric acid, 1N nitric acid, 0.3% EDTA, 3% EDTA, and 5% hydrogen peroxide were employed as cleaning liquids instead of pure water, and the same analysis was performed. Table 4 shows the results. All the above treatments were performed at ambient temperature.

The results indicate that no heavy metals such as Ti, W, and V, serving as catalyst components, are eluted during regeneration treatment employing pure water. In Working Example 1, elution of CaO, $SO_3$, and NaO, which are substances inhibiting catalytic performance, was confirmed.

TABLE 4

| Regeneration liquid | | Catalyst components | | | Covering components | | Alkali metals | |
|---|---|---|---|---|---|---|---|---|
| | | Ti | W | V | Si | Ca | Na | K |
| Pure water (Working Ex. 1) | | — | X | — | △ | ○ | ○ | △ |
| Oxalic acid | 0.1N | ○○ | ○○ | △ | △ | ○ | ○ | △ |
| Hydrochloric acid | 1N | ○○ | X | △ | △ | ○ | ○ | △ |
| Nitric acid | 0.1N | △ | X | △ | △ | ○ | ○ | △ |
| Nitric acid | 1N | ○○ | X | △ | △ | ○ | ○ | △ |
| EDTA | 0.3% | ○ | ○○ | △ | ○○ | ○ | △ | △ |
| EDTA | 3% | ○○ | ○○ | △ | ○○ | ○ | ○○ | △ |
| Hydrogen peroxide | 5% | ○ | ○○ | ○ | △ | ○ | ○ | △ |

—: Insoluble (10 mg/kg · catalyst or less)
X: Hardly soluble (10 to 100 mg/kg · catalyst)
△: Slightly soluble (100 to 500 mg/kg · catalyst)
○: Soluble (500 to 1,000 mg/kg · catalyst)
○○: very soluble (1,000 to 10,000 mg/kg · catalyst)
*: Remarkably Soluble (10,000 mg/kg · catalyst or more)

The invention claimed is:

1. A method for regenerating an $NO_x$ removal catalyst employed in a flue gas $NO_x$ removal apparatus, characterized in that the method consists of
    (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas, with bubbling from the $NO_x$ removal catalyst, from 1 to 30 minutes at a temperature of about 5° C. to about 40° C. in regeneration water consisting of pure water, such that none of the at least one of Ti, V, W and oxides thereof is eluted to the regeneration water, and wherein the first step does not include any other processes;
    (ii) a second step of removing the catalyst from the regeneration water, and removing water from the catalyst; and
    (iii) a third step of treating the regeneration water which has been employed in a regeneration step in a wastewater treatment facility without performing a treatment step on regenerating water to remove the at least one of Ti, V, W and oxides thereof; and
    wherein the regenerating water is reused.

2. A method for regenerating an $NO_x$ removal catalyst according to claim 1, wherein the $NO_x$ removal catalyst is immersed in regeneration water until bubbling stops and, subsequently, removed from the regeneration water.

3. A method for regenerating an $NO_x$ removal catalyst employed in a flue gas $NO_x$ removal apparatus, characterized in that the method consists of
    (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas, with bubbling from the $NO_x$ removal catalyst, from 1 to 30 minutes at a temperature of about 5° C. to about 40° C. in regeneration water consisting of pure water, such that none of the at least one of Ti, V, W and oxides thereof is eluted to the regeneration water, and wherein the first step does not include any other processes;
    (ii) a second step for removing the catalyst from the regeneration water, washing the $NO_x$ removal catalyst removed from the regeneration water with water, and removing water from the catalyst; and
    (iii) a third step for treating the regeneration water which has been employed in a regeneration step in a wastewater treatment facility without performing a treatment step on the regenerating water to remove the at least one of Ti, V, W and oxides thereof; and
    wherein the regenerating water is reused.

4. A method for regenerating an $NO_x$ removal catalyst according to claim 3, wherein the $NO_x$ removal catalyst is immersed in regeneration water until bubbling stops and, subsequently, removed from the regeneration water.

5. A method for regenerating an $NO_x$ removal catalyst according to claim 1, wherein the regeneration water which has been used in the regeneration step is treated in the treatment step after it is repeatedly used, without undergoing any treatment, a plurality of times in a regeneration step for regenerating another $NO_x$ removal catalyst.

6. A method for regenerating an $NO_x$ removal catalyst according to claim 2, wherein the regeneration water which has been used in the regeneration step is treated in the treatment step after it is repeatedly used, without undergoing any treatment, a plurality of times in a regeneration step for regenerating another $NO_x$ removal catalyst.

7. A method for regenerating an $NO_x$ removal catalyst according to claim 3, wherein the regeneration water which has been used in the regeneration step is treated in the treatment step after it is repeatedly used, without undergoing any treatment, a plurality of times in a regeneration step for regenerating another $NO_x$ removal catalyst.

8. A method for regenerating an $NO_x$ removal catalyst according to claim 4, wherein the regeneration water which has been used in the regeneration step is treated in the treatment step after it is repeatedly used, without undergoing any treatment, a plurality of times in a regeneration step for regenerating another $NO_x$ removal catalyst.

9. A method for regenerating an $NO_x$ removal catalyst employed in a flue gas $NO_x$ removal apparatus, characterized in that the method consists of
    (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas and containing heavy metal, with bubbling from the $NO_x$ removal catalyst, from 1 to 30 minutes at a temperature of about 5° C. to about 40° C. in regeneration water consisting of pure water, such that none of the at least one of Ti, V, W, and oxides thereof is eluted to the regeneration water, and wherein the first step does not include any other processes;
    (ii) a second step of removing the catalyst from the regeneration water, and removing water from the catalyst;
    (iii) a third step of treating the regeneration water which has been employed in a regeneration step in a wastewater treatment facility without performing a treatment step on regenerating water to remove the at least one of Ti, V, W and oxides thereof; and (iv) a fourth step of installing the $NO_x$ removal catalyst having been regenerated in the flue gas $NO_x$ removal apparatus without drying the catalyst before installation; and wherein the regenerating water is reused.

10. A method for regenerating an $NO_x$ removal catalyst employed in a flue gas $NO_x$ removal apparatus, characterized in that the method consists of (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas and containing heavy metal, with bubbling from the $NO_x$ removal catalyst, from 1 to 30 minutes at a temperature of about 5° C. to about 40° C. in regeneration water consisting of pure water, such that none of at least one of Ti, V, W and oxides thereof is eluted to the regeneration water;

(ii) a second step of removing the catalyst from the regeneration water, and removing water from the catalyst;

(iii) a third step of treating the regeneration water which has been employed in a regeneration step in a wastewater treatment facility without performing a treatment step on regenerating water to remove the at least one of Ti, V, W, and oxides thereof; and (iv) a fourth step of installing the $NO_x$ removal catalyst having been regenerated in the flue gas $NO_x$ removal apparatus after catalytic performance of the regenerated $NO_x$ removal catalyst is assessed; and wherein the regenerating water is reused.

11. A method for regenerating an $NO_x$ removal catalyst employed in a flue gas NOx removal apparatus, characterized in that the method consists of (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas and containing heavy metal, with bubbling from the $NO_x$ removal catalyst, from 1 to 30 minutes at a temperature of about 5° C. to about 40° C. in regeneration water consisting of pure water, such that none of the at least one of Ti, V, W and oxides thereof is eluted to the regeneration water;

(ii) a second step of removing the catalyst from the regeneration water, and removing water from the catalyst;

(iii) a third step of treating the regeneration water which has been employed in a regeneration step in a wastewater treatment facility without performing a treatment step on regenerating water to remove the at least one of Ti, V, W and oxides thereof; wherein the method further consists of installing the $NO_x$ removal catalyst having been regenerated in the flue gas $NO_x$ removal apparatus without drying the catalyst before installation; and (iv) a fourth step of installing the $NO_x$ removal catalyst having been regenerated in the flue gas $NO_x$ removal apparatus after catalytic performance of the regenerated $NO_x$ removal catalyst is assessed; and wherein the regenerating water is reused.

12. A method for regenerating an $NO_x$ removal catalyst employed in a flue gas $NO_x$ removal apparatus, characterized in that the method consists of (i) a first step of immersing the $NO_x$ removal catalyst in the form of a columnar honeycomb structure, wherein the $NO_x$ removal catalyst contains at least one of Ti, V, W and oxides thereof, which $NO_x$ removal catalyst having been used to remove $NO_x$ from flue gas and containing heavy metal, with bubbling from the $NO_x$ removal catalyst, from 1 to 30 minutes at a temperature of about 5° C. to about 40° C. in regeneration water consisting of pure water, such that none of the at least one of Ti, V, W and oxides thereof is eluted to the regeneration water, and wherein the first step does not include any other processes;

(ii) a second step of removing the catalyst from the regeneration water, and removing water from the catalyst;

(iii) a third step of treating the regeneration water which has been employed in a regeneration step in a wastewater treatment facility without performing a treatment step on regenerating water to remove the at least one of Ti, V, W and oxides thereof; and (iv) a fourth step of installing the regenerated $NO_x$ removal catalyst in the flue gas $NO_x$ removal apparatus such that the catalyst is inverted with respect to an original position of the catalyst before regeneration; and wherein the regenerating water is reused.

13. A method for regenerating an $NO_x$ removal catalyst according to claim 9, wherein the regenerated $NO_x$ removal catalyst is installed in the flue gas $NO_x$ removal apparatus such that the catalyst is inverted with respect to an original position of the catalyst before regeneration.

14. A method for regenerating an $NO_x$ removal catalyst according to claim 10, wherein the regenerated $NO_x$ removal catalyst is installed in the flue gas $NO_x$ removal apparatus such that the catalyst is inverted with respect to an original position of the catalyst before regeneration.

15. A method for regenerating an $NO_x$ removal catalyst according to claim 11, wherein the regenerated $NO_x$ removal catalyst is installed in the flue gas $NO_x$ removal apparatus such that the catalyst is inverted with respect to an original position of the catalyst before regeneration.

* * * * *